March 7, 1944.  R. D. SCHOTT  2,343,585
RUBBER AND PLASTIC WATER LUBRICATED BEARING
FOR VERTICAL TURBINE PUMPS
Filed July 21, 1941
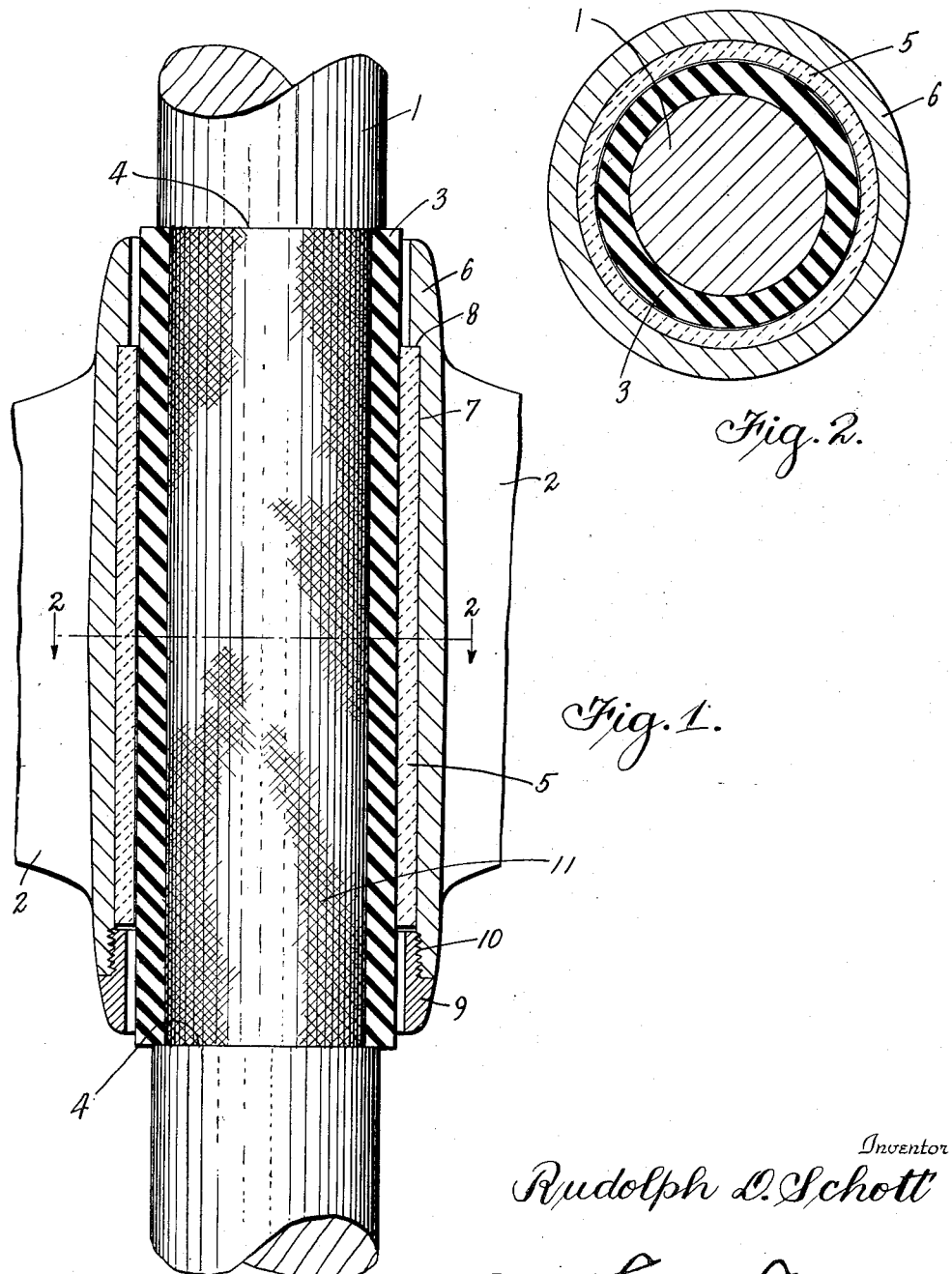
Inventor
Rudolph D. Schott
By Lyon & Lyon
Attorneys Patented Mar. 7, 1944

2,343,585

UNITED STATES PATENT OFFICE 2,343,585

RUBBER AND PLASTIC WATER LUBRICATED BEARING FOR VERTICAL TURBINE PUMPS

Rudolph D. Schott, Pomona, Calif., assignor, by mesne assignments, to Joshua Hendy Iron Works, Sunnyville, Calif., a corporation of Nevada Application July 21, 1941, Serial No. 403,325

2 Claims. (Cl. 308—238)

This invention relates to rubber and plastic water lubricated bearing for vertical turbine pumps, and more particularly to the provision of a bearing and shaft bearing sleeve construction adapted to be lubricated by the liquid in which the shaft and bearing are submerged or the liquid being moved through the path including the bearing.

It has heretofore been common practice to provide a rust and corrosion resistant sleeve on each shaft where the shaft passes through a guide in order to maintain a smooth, non-corrosive surface for bearing purposes.

In this construction it is proposed to use a resilient rubber sleeve set into or upon the shaft and wherein the said rubber sleeve is held to prevent its altering its position upon the shaft. In this practice the rubber sleeve has been attached to the shaft by expanding or stretching it over the end portion of the shaft and sliding the same along the shaft to its desired position, usually an under-cut portion of the shaft in which the rubber sleeve assumes practically its original size. In this use the rubber sleeve grips the shaft and is more or less permanently located upon the shaft in its desired position.

It is an object of this invention to provide a bearing couple for a shaft which is water-lubricated or is lubricated by the liquid being pumped or moved or in which the bearing couple is submerged and which bearing couple includes a rubber or synthetic rubber compound operating in conjunction with a plastic surface.

Another object of this invention is to provide a bearing couple including a rubber or synthetic rubber compound operating against a plastic sleeve held by a bearing retainer to support or guide a vertically rotating shaft and where the said bearing couple is submerged in a liquid and lubricated thereby.

Another object of this invention is to provide a bearing couple for a shaft which includes a rubber sleeve operating in conjunction with a plastic sleeve replaceably held in a bearing retainer in such manner as to permit ready replacement.

Another object of this invention is to provide a bearing couple including a rubber or rubber-like material operating in conjunction with a plastic sleeve and which bearing couple includes as one of the operating surfaces said rubber or rubber-like resilient material permitting the handling of sand or gritty liquids without danger of scoring either member of the bearing couple.

Another object of this invention is to provide a bearing couple composed of rubber or a synthetic rubber compound and a plastic material adapted to be lubricated by a liquid within which the bearing is submerged and which bearing couple has a very low coefficient of liquid absorption permitting operation of the bearing couple without abnormal swelling whereby predetermined bearing clearances may be maintained.

Other objects and advantages of this invention it is believed will be apparent from the following detailed description of a preferred embodiment thereof as illustrated in the accompanying drawing.

In the drawing I have illustrated my invention as it is particularly adapted to use upon the vertically positioned shaft 1 of a vertical turbine pump.

Figure 1 is a section thru the bearing assembly illustrating my invention.

Figure 2 is a section taken on the line 2—2 of Figure 1.

As is well understood in this art, the shaft 1 extends from the surface into a well or other position of submerged liquid and provides the means for rotating the turbine blades for lifting the liquid through the column provided by the pipe or casing within which the shaft 1 is positioned. A pump of this character is illustrated in the Schott Patent No. 2,236,953, issued April 1, 1941, for Centrifugal pumps.

As is well known in this art, the shaft 1 is guided at a plurality of points vertically spaced downward from the top of the well by means of guide members 2 carried by the pipe or casing forming the lift column within which the shaft 1 is positioned. A greater or lesser number of such guides 2 are utilized, depending upon the depth of the well or height of the lift.

The bearing couple embodying my invention includes a sleeve 3 positioned upon the shaft 1 at an under-cut 4. The under-cut 4 is approximately equal to the length of the sleeve 3 to prevent vertical shifting or moving of the sleeve. The sleeve 3 is formed of rubber or synthetic rubber such as that known as "neoprene" or the like.

The sleeve is stretched over the shaft 1 from the end thereof until the same passes into the under-cut 4 where it assumes its original shape practically free of stretch. The other member of the bearing couple includes a sleeve 5 which is held in the bearing retaining section 6 of the guide 2. The sleeve 5 is formed of any suitable plastic such as the plastics formed of cellulose acetate or cellulose acetate butyrate, examples of which are sold under the trade names of Tenite No. 1 and Tenite No. 2. Plastics of these compositions are also sold under various other trade names, the particular characteristic of which, most valuable in the formation of this type of bearing couple, is that they provide a very smooth bearing surface and this smooth surface may be easily attained by merely wiping the bearing portion with a suitable solvent for the plastic, such as acetone.

The plastic sleeve 5 is positioned within the bearing retainer 6 in a sleeve recess 7 terminating at one end with a shoulder 8 and at the opposite end by a removable retainer cap 9 which is threaded at threads 10 to the retainer 6. The plastic sleeve 5 is loosely mounted in the retainer recess 7 so that it may be easily removed for replacement or repair without the necessity of special tools.

It is preferable in most instances to insure that the rubber or rubber-like sleeve 3 be held upon the shaft 1 against relative rotation. Any suitable means of holding the sleeve 3 to the shaft 1 may be employed and I have found that it is most practical to knurl the under-cut surface 11 of the shaft so that the roughened surface of the shaft provided by such knurling holds the sleeve 3 from rotation.

The bearing couple thus provided is adapted particularly for operation under submerged conditions as in a vertically disposed water turbine pump where the bearing surface provided between the rubber or rubber-like material sleeve 3 and the plastic sleeve 5 is water-lubricated by the water being pumped. The bearing couple is also particularly applicable for use in other submerged types of pumps such as those operating to pump petroleum or other similar products under which cases the use of synthetic rubber compounds such as "neoprene" for the formation of the sleeve 3 is particularly advantageous as such synthetic rubber compounds do not absorb petroleum and therefore are not subject to abnormal swelling when the bearing surface is lubricated by the petroleum being pumped. In the handling of gritty or sand-laden fluid, it is preferable that the rubber sleeve 3 be formed of resilient or "soft" rubber or synthetic rubber compound, as in such case the sand-laden or gritty liquids may be pumped or moved through the bearing surfaces provided without danger of scoring either the sleeve 3 or the plastic sleeve 5.

Having fully described my invention, it is to be understood that I do not wish to be limited to the details herein set forth, but my invention is of the full scope of the appended claims.

I claim:

1. A shaft bearing, including a sleeve of rubber material, and a sleeve of a plastic from the group consisting of cellulose acetate or cellulose acetate butyrate plastics.

2. A shaft bearing, including a pair of concentrically positioned sleeves forming a bearing couple, one of which sleeves is of a rubber material, the other of which sleeves is formed of a plastic from the group consisting of cellulose acetate or cellulose acetate butyrate, one of which sleeves is held upon the shaft and the other of which sleeves is held in a bearing retainer.

RUDOLPH D. SCHOTT.